INVENTORS
TOSHIO ITO
TOSHIO MIYAMOTO
YUTAKA MURAI
YUICHI WADA

ATTORNEYS

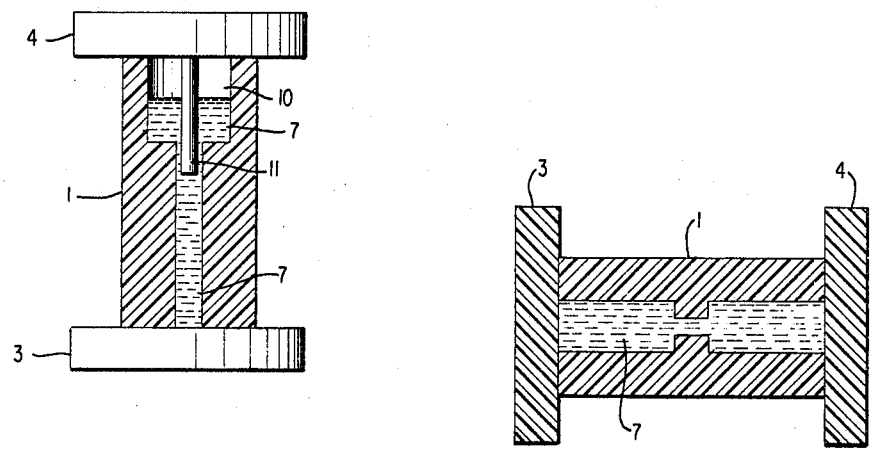
FIG.7
FIG.8
FIG.9
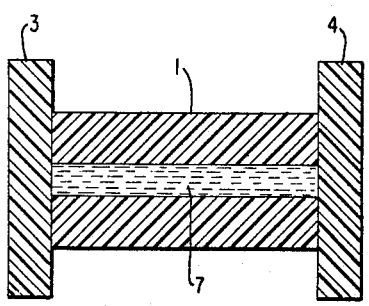
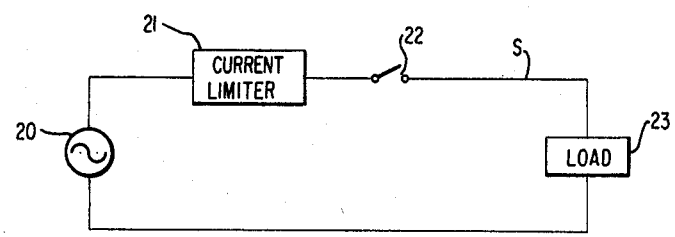
FIG.10
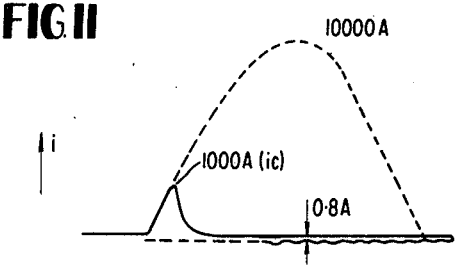
FIG.11

United States Patent Office 3,501,730
Patented Mar. 17, 1970

3,501,730
CURRENT LIMITING EQUIPMENT
Toshio Ito, Toshio Miyamoto, Yutaka Murai, and Yuichi Wada, Amagasaki-shi, Japan, assignors to Mitsubishi Denki Kabushiki Kaisha, Tokyo, Japan
Filed Feb. 26, 1968, Ser. No. 708,048
Claims priority, application Japan, Feb. 25, 1967, 42/11,942
Int. Cl. H01h 85/04
U.S. Cl. 337—159      2 Claims

ABSTRACT OF THE DISCLOSURE

Current limiting equipment of a self restoration type in which current limiting is accomplished by evaporation of alkali metal. An alkali metal which is in liquid or solid state at ordinary temperature is contained in a casing devised to make the alkali metal evaporate and perform a current limiting operation by flow of a short-circuit current. The remarkably high vapor pressure caused by evaporation of the alkali metal and by a pressure buffer set up in the casing in the current-limiting process of this current limiting equipment is controlled to the optimum value required for current limit operation. Vapor pressure is also maintained at the optimum pressure during the current limit operation.

Further breaking of a circuit connected with such a current limiting equipment is performed not only by the current limiting equipment, but is also performed by other disconnecting switches or breaker means connected in series with the current limiting equipment.

BACKGROUND OF THE INVENTION

Although a conventional, well-known fuse for current limiting is used in combination with a series breaker like this invention, because such a fuse changes into a permanent insulator in one current limiting operation thus further use of the fuse becomes impossible and exchange thereof is required.

Another conventional means for protecting against such a fault uses current limiting equipment of the self restoration type, constructed in such a way that an electrical conductor which is liquid at ordinary temperature is used as a current limiting material. A hole in a rigid insulator having at least one penetrating capillary hole is filled with the conductor. The conductor and the insulator are then covered with a sealed enclosed body of substantial rigidity. But in such a device, a conductive path of the electric conductor must be within a little capillary hole of 0.01–0.03 mm. in order to withstand remarkably high vapor pressure caused by evaporation of the current limit material. The members covering the insulator and hole must be made of rigid material having large mechanical strength.

To construct current limiting equipment of the self restoration type which is quickly restored to its former condition after current limit operation and which is capable of repeatedly performing current limit action, current limiting equipment based on an entirely different principle from the former fuse is required.

Such current limiting material must be capable of satisfying all of the following conditions:

(1) At ordinary temperature, it is a good electric conductor of the same degree as metals;

(2) The conductor is evaporated by Joule heat caused by presenting a remarkably higher resistance than the short circuit impedance of the circuit, and (3) Once the current limit operation is performed, the material is liquefied and solidified by cooling or substitution and recovers initial electric conductivity again.

As such a material, mercury (hereinafter described as Hg) is the most obvious example, but it has been found theoretically and experimentally that sodium (hereinafter described as Na), potassium (hereinafter described as K), and a solid solutional mixture of Na and K (hereinafter abbreviated as NaK) have more remarkably excellent quality for such a current limiting material than that of Hg. By utilizing Na, K and NaK as a current limiting material, it has been found that the current limiting equipment of a self restoration type having remarkably excellent qualities can be constructed.

In order that current limit operation may be performed effectively and successfully, it is necessary that the current limiting means rapidly absorbs the energy from the applied current. The specific resistance $\rho$ of a high-temperature, high-pressure plasma obtained by evaporation of the current limiting material is remarkably higher than the specific resistance $\rho$ in the vicinity of the ordinary temperature. The specific resistance at 20° C. of Hg is 100 $\mu\Omega$ cm., and of K is 7 $\mu\Omega$ cm. Therefore, at ordinary temperatures, the resistance of K is much less than that of Hg.

FIGURE 1 graphically illustrates characteristic curves of the specific resistance $\rho$ of high-pressure plasma obtainable by evaporation of Hg and K. These characteristic curves are drawn with the enthalpy $h$ injected into the material varying along the horizontal axis and the corresponding material conductivity $s$ (electrical resistance $R=\frac{1}{s}$) for this enthalpy $h$ at 100 a.p. (i.e., atmospheres of pressure) varying along the vertical axis. As is obvious from this diagram when energy $h$ of $10^6$ J./kg. has been injected, the resistance value R becomes 1KΩ cm. for K and 0.3Ω cm. for Hg. Likewise, when energy of $2\times10^6$ J./kg. has been injected, R becomes 3Ω cm. for K and 0.16Ω cm. for Hg. In short in the state of high-temperature plasma, the resistance value of K becomes much larger than that of Hg. Consequently, it has become obvious that K has the resistance value of which is small for ordinary temperature where a low current flows, and which becomes large in the high temperature condition where a high short circuit current flows. Thus, K has an exceedingly advantageous resistance characteristic in comparison with that of Hg.

Atmosphere pressures of 5000° K. plasma space wherein unit volumes of K and Hg have been completely evaporated in a chamber made of the rigid body of the same volume, respectively amount to 4600 a.p. with Hg and 2000 a.p. with K. But according to an experiment concerning current limit operation performed using alkali metals such as K, Na and NaK, it has been found that even where evaporating pressure is about 100 a.p., the current limiting function can be performed. Accordingly, the material having the smaller rise of pressure at the time of evaporation under the same volume, or in other words, the smaller change of volume at the time of evaporation under the same pressure, is advantageous from the design point of view because such material can be used with a thinner vessel wall. K has the smaller rise of pressure in comparison with Hg.

SUMMARY OF THE INVENTION

The present invention concerns equipment wherein such alkali metals as K, Na and NaK are used as current limiting materials. Pressure buffer means for controlling and maintaining rise of evaporating pressure is applied to the current limiting equipment for current limit operation of these current limiting materials at the required optimum value. By constructing the system in this manner, special consideration is not necessary for a pressure-tight design of the part where current limiting materials are filled up and evaporated.

BRIEF DESCRIPTION OF THE DRAWINGS

FIGURES 2 through 9 are concrete structural views showing embodiments of the invention in side sectional views.

FIGURE 10 is a connection diagram showing an example of the circuit using the current limiting means.

FIGURE 11 is a curvilinear graph showing condition change of a line current when the current limiting means is operating in the circuit in FIGURE 10.

The same signs in the drawings are used to represent the same or corresponding parts.

DESCRIPTION OF THE PREFERRED EMBODIMENTS

Figure 1:
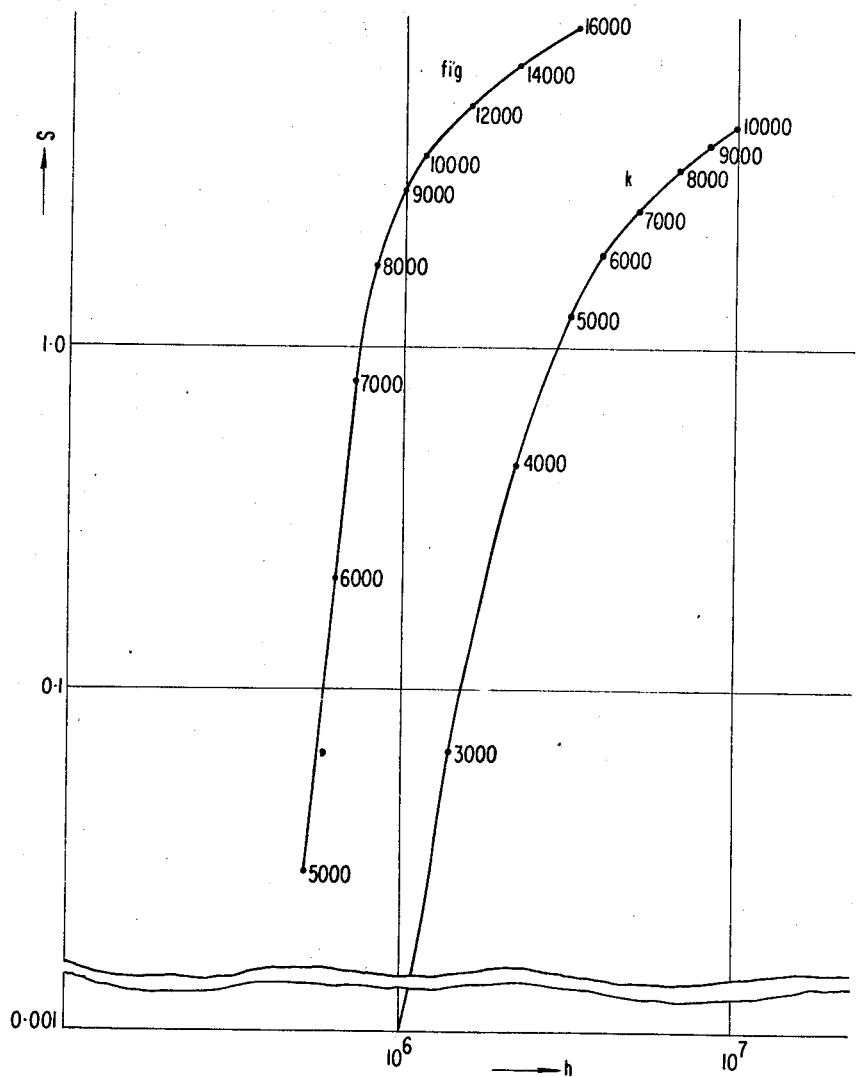
FIGURE 1 is a curvilinear graph showing electric and thermal characteristics of current limiting materials adopted in the present invention.
Figure 2:
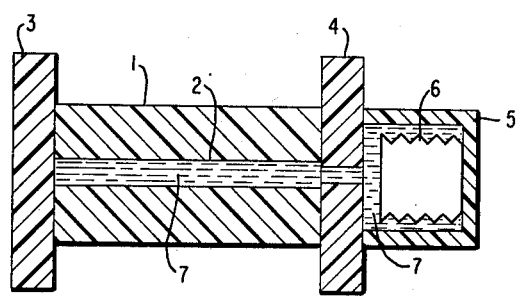

FIGURE 2 shows a typical embodiment of the present invention. A casing 1 of an insulator is composed of various material. Near the center of the casing, one or more penetrating holes 2 are set up. The diameters of these penetrating holes 2 are typically about 1 mm., which is not at all like a capillary tube. Flanges 3 and 4 enclose both ends of casing 1, and hold the casing 1. The casing 1 and flanges 3 and 4 can be constructed pressure-tightly by such methods as welding, vapor plating, or pressure-tight construction which can be disassembled as through an O ring seal. Flanges 3 and 4 each have current connecting terminals. The space between the two flanges 3 and 4 is adjustable by screwing an insulating bolt or a metal bolt through an insulating bushing for tightening up the casing 1 as occasion demands. Pressure buffer means 5 controls and maintains rise of evaporating pressure. In this FIGURE 2 embodiment, it comprises a bellows 6 which is filled with nitrogen ($N_2$) or argon gas (Ar) at a predetermined pressure. A current limiting material 7 of an alkali metal fills in the penetrating hole 2 of the casing 1 and fills in the part of the pressure buffer means 5 outside the bellows 6.

Pressure buffer operation in this constitution is carried out as follows: Short circuit current causes evaporation of the alkali metal filled in the penetrating hole 2 and in the part of the pressure buffer means 5 which is outside the bellows 6. The pressure rises, the bellows 6 contracts by differential pressure from pressure in this bellows, and compensating cubical expansion of the part filled with the alkali metal. Pressure is maintained in an equilibrium state, and rapid rise of pressure is controlled.

By using such a compressible pressure buffer means of variable volume, high speed self restoration after current limit breaking becomes possible. Since the surrounding liquid alkali metal 7 is rapidly forced by back pressure of the bellows into the place of the alkali metal evaporated after current limit operation, the penetrating hole 2 and the part of the pressure buffer means 5 outside the bellows 6 are immediately filled with the liquid alkali metal, and are rapidly restored to the former condition.

Figure 3:
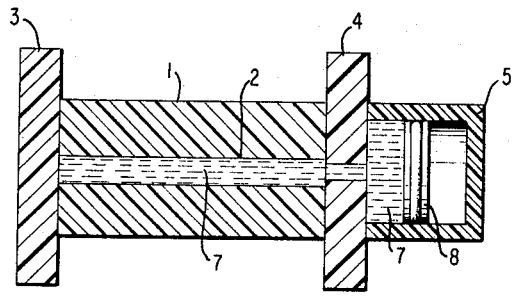

In the embodiment in FIGURE 3, the pressure buffer means 5 uses a piston 8 instead of the bellows 6 used in FIGURE 2. The buffer is set up with one side of the piston containing the current limiting material 7 and the other side containing a compressible gas such as nitrogen ($N_2$), argon (Ar), at a predetermined pressure.

Figure 4:
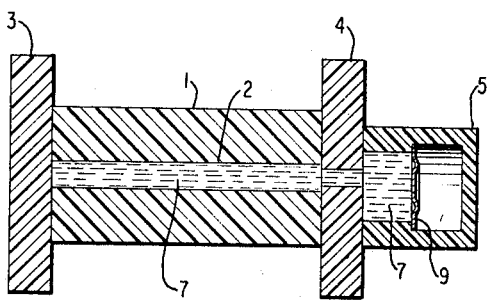

The embodiment in FIGURE 4 is provided with a pressure buffer means 5 in which elongation of a flexible diaphragm 9 instead of the bellows 6 or piston 8 is utilized.

Figure 5:
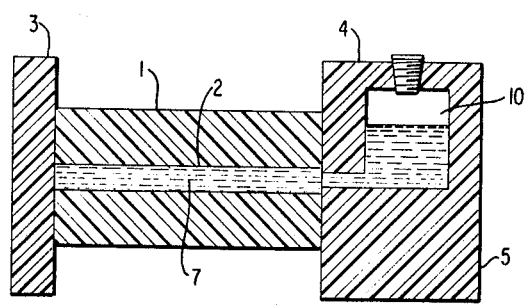
Figure 6:
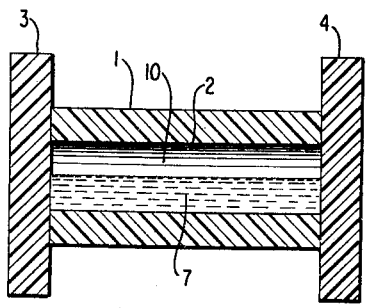

Buffer operation of the pressure buffer means 5 shown in FIGURE 3 and FIGURE 4 is carried out in almost the same manner as explained in connection with FIGURE 2. The three embodiments mentioned above have flexibility as to what the pressure buffer means comprises. Similar controlling and maintenance of rise of pressure can be performed by other pressure buffer means having a variable volume space. FIGURE 5 and FIGURE 6 illustrate other embodiments which allow the current limiting material 7 of alkali metal and the space of variable volume 10 to coexist in the same vessel in the same space. Space 10 may be vacuous or be filled with an inert gas or argon gas. Pressure buffer operation with this construction is performed by controlling the extra rise of pressure since the volume of space 10 reduces by evaporation of alkali metal 7, and the volume of space 10 is restored again after completion of the current limiting operation.

The embodiment in FIGURE 7 uses the same principle of operation as in FIGURES 5 and 6. In this embodiment, the equipment is used vertically. A current connecting terminal 11 is connected to one flange 4, and this terminal 11 is immersed in the liquid or solid alkali metal 7 so that operation of the device may be carried out.

The embodiment in FIGURE 8 has a casing 1 in which the sectional areas of the parts to be filled with alkali metal current limiting material 7 are not uniform. Thus, by changing section areas in an axial direction, the part having a large sectional area can have a conducting capacity left in reserve at all times. The part having a locally reduced sectional area can have promoted therein rapid evaporation and vaporization growth of the current limiting material 7.

The embodiment in FIGURE 9 is one wherein the use of flexible materials in the casing 1 itself aids in controlling of rise of pressure. Rubber hose containing iron wire for withstanding high pressure, ethylene tetrafluoride resin, nylon, glass epoxide, or the like can be used as materials of the casing 1.

As mentioned above, in the present invention, current limiting devices having various pressure buffer functions are disclosed. It is obvious that these should be suitably selected in accordance with use, purpose, place of use and the like.

FIGURE 10 illustrates a typical circuit using the current limiting device of the disclosed invention. In FIGURE 10, an AC power source 20, the disclosed current limiting device 21, a breaker or a disconnecting switch 22, and a load 23 are connected in series circuit.

In such a circuit, resistance at ordinary temperature of the current limiting device 21 is very small, and radiation of heat due to the rated conductivity current at all times is sufficient to maintain heat equilibrium. The current limiting device 21 allows a constant conducting current to pass, supplying ordinary electric power to the load 23. But if short circuit occurs at a point S, then within the current limiting device 21, evaporation of the current limiting material occurs due to Joule heat caused by the high short circuit current. Finally, device 21 presents a specific resistance of about 1Ω cm., so that the short circuit current is limited. This limited current can be completely interrupted by opening the circuit by means of a breaker 22 or the like, connected in series. For example now, when a device having a part filled with the current limiting material of about 1 mm. in diameter and 10 cm. in length is used as the current limiting equipment 21 in the circuit, and if the circuit has a short circuit capacity of 800 v. 10,000 A., the current is limited rapidly to a value under 1000 A., and because the resistance of the current limiting equipment 21 amounts to more than about 1 KΩ in this case, the current becomes under 0.8 A. As mentioned in the above, this part of the current is perfectly interrupted by means of a breaker or the like. The change of the line current $i$ at this time is shown in FIGURE 11.

As stated above, according to this invention, because the current limiting materials have good characteristics at comparatively low temperatures, the requirement no longer exists that all parts of the current limiting device consist of a rigid body as required in previous devices. Because of the use of a pressure buffer, a part of which consists of flexible substance or compressible space of variable volume, it is no longer necessary to give special consideration to pressure-tight design of the part in which the current limiting material is filled and evaporated.

Moreover, by use of the current limiting material and the pressure buffer means as stated above, the diameter of the penetrating hole filled with current limiting material can be chosen more than 1 mm. which is not like a capillary tube. In previous devices, the penetrating hole has a capillary-tube-like diameter of 0.01–0.03 mm. In such previous devices, a change in form and dimension of the capillary tube, or further blockage of the hole caused by multifrequency operation can exert a great deal of bad influence on the current limiting operation. But in the disclosed invention in which the diameter of the penetrating hole is chosen about 1 mm., many cycles of current limit operations can be performed with stability and certainty, since the change in form and dimension of the hole is so small that it is negligible compared with 1 mm. Another advantage of the fact that the diameter of the penetrating hole is such that it is not capillary-tube-like, when the conductive current limiting material is evaporated by and is replaced rapidly after current limit action, the device can be quickly restored to the initial condition, and can be ready for the following current limit operation. This fact becomes very advantageous when high speed reclosing and repeated current limit operations are required.

The specification has disclosed advantages in the case where the geometrical dimension of the part to be filled with the current limiting material (the penetrating hole) has been selected with a dimension which is not capillary-tube-like. However, in the present invention, if the current limiting device is one wherein some part of the current limiting means is not a rigid body, and a part of the device has a substance or space for pressure buffer operation, the invention could be used with a device having a hole of capillary-tube-like dimension, and such would be within the scope of the invention. A capillary tube would not, however, be used in the preferred embodiment.

Many more examples of the application of the present invention will suggest themselves to those skilled in the art. Alternative methods of accomplishing the invention may suggest themselves to those skilled in the art.

What is claimed is:
1. A current limiting device comprising
  (a) a conductive current limiting material composed of evaporable alkali metal,
  (b) a casing for containing said current limiting material in a sealed condition, said casing being filled with said current limiting material,
  (c) terminal members electrically connected with opposite ends of said current limiting material for conducting a current through said current limiting material, and
  (d) a pressure buffer means for controlling and maintaining to a predetermined value the pressure generated in said casing by evaporation of said current limiting material caused by conduction of an amount of said current exceeding a predetermined amount by said current limiting material, comprising an expansible means operatively connected to said current limiting material.
2. A current limiting device according to claim 1 wherein said current limiting material is selected from the group consisting of sodium, potassium, and a solid solutional mixture of sodium and potassium.

References Cited

UNITED STATES PATENTS 3,205,321  9/1965  Lyon _____ 200—61.05
3,265,490  8/1966  Yoshizawa et al. _____ 204—68

HERMAN O. JONES, Primary Examiner

U.S. Cl. X.R.

337—114